United States Patent
Cheon et al.

(10) Patent No.: US 10,250,327 B2
(45) Date of Patent: Apr. 2, 2019

(54) ILLUMINATION SYSTEM AND CONTROL METHOD THEREOF

(71) Applicant: LG ELECTRONICS INC., Seoul (KR)

(72) Inventors: Jeongin Cheon, Seoul (KR); Dohyung Lee, Seoul (KR); Hongkyu Lee, Seoul (KR); Byunghun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/397,674

(22) Filed: Jan. 3, 2017

(65) Prior Publication Data

US 2017/0195046 A1    Jul. 6, 2017

(30) Foreign Application Priority Data

Jan. 5, 2016  (KR) .................. 10-2016-0001181
Jan. 5, 2016  (KR) .................. 10-2016-0001182

(51) Int. Cl.
*H04B 10/116*  (2013.01)
*H04B 10/073*  (2013.01)
(Continued)

(52) U.S. Cl.
CPC ......... *H04B 10/116* (2013.01); *H04B 10/073* (2013.01); *H04L 12/283* (2013.01);
(Continued)

(58) Field of Classification Search
CPC ... H04B 10/116; H04B 10/073; H04L 12/283; H04L 2012/285; G06F 3/04842; G06F 3/0488
(Continued)

(56) References Cited

U.S. PATENT DOCUMENTS 8,432,438 B2 *  4/2013  Ryan .................. H05B 37/0272
                                              332/109
9,635,378 B2 *  4/2017  Holub ................. H04N 19/467
(Continued)

FOREIGN PATENT DOCUMENTS

JP   2015012537    1/2015
WO   2015002414    1/2015

OTHER PUBLICATIONS

European Patent Office Application Serial No. 17150214.9, Search Report dated Aug. 22, 2017, 8 pages.
(Continued)

*Primary Examiner* — Juan A Torres
(74) *Attorney, Agent, or Firm* — Lee Hong Degerman Kang & Waimey

(57) ABSTRACT

A method for operating an illumination system that includes at least one illumination device, a server configured to perform wireless communication with the illumination device, and a terminal configured to perform optical communication with the illumination device. The method includes sending information regarding an operation mode of the illumination device from the terminal to the server, sending a control signal from the server to the illumination device based on the information regarding an operation mode, performing visible light communication based on identification information of the illumination device when the illumination device receives the control signal, detecting the identification information of the illumination device through the terminal based on the visible light communication, matching the detected identification information with location information of the illumination device, and sending the identification information and the location information of the illumination device that are matched each other to the server.

10 Claims, 8 Drawing Sheets

(51) Int. Cl.
*H04L 12/28* (2006.01)
*G06F 3/0484* (2013.01)
*G06F 3/0488* (2013.01)

(52) U.S. Cl.
CPC ........ *H04L 12/2809* (2013.01); *G06F 3/0488* (2013.01); *G06F 3/04842* (2013.01); *H04L 2012/285* (2013.01)

(58) Field of Classification Search
USPC .......................................................... 398/17
See application file for complete search history.

(56) References Cited

U.S. PATENT DOCUMENTS

| | | | |
|---|---|---|---|
| 2013/0028612 A1* | 1/2013 | Ryan .......................... | G01S 1/70 398/172 |
| 2014/0045549 A1* | 2/2014 | Ryan .................... | H04N 5/3532 455/556.1 |
| 2015/0003836 A1 | 1/2015 | Yamasaki et al. | |
| 2016/0191158 A1* | 6/2016 | Aoyama ............ | H04B 10/1149 398/172 |
| 2016/0381766 A1 | 12/2016 | Choi | |
| 2017/0373753 A1* | 12/2017 | Darabi ................. | H04B 10/116 |

OTHER PUBLICATIONS

European Patent Office Application Serial No. 17150214.9, Search Report dated May 4, 2017, 9 pages.

\* cited by examiner

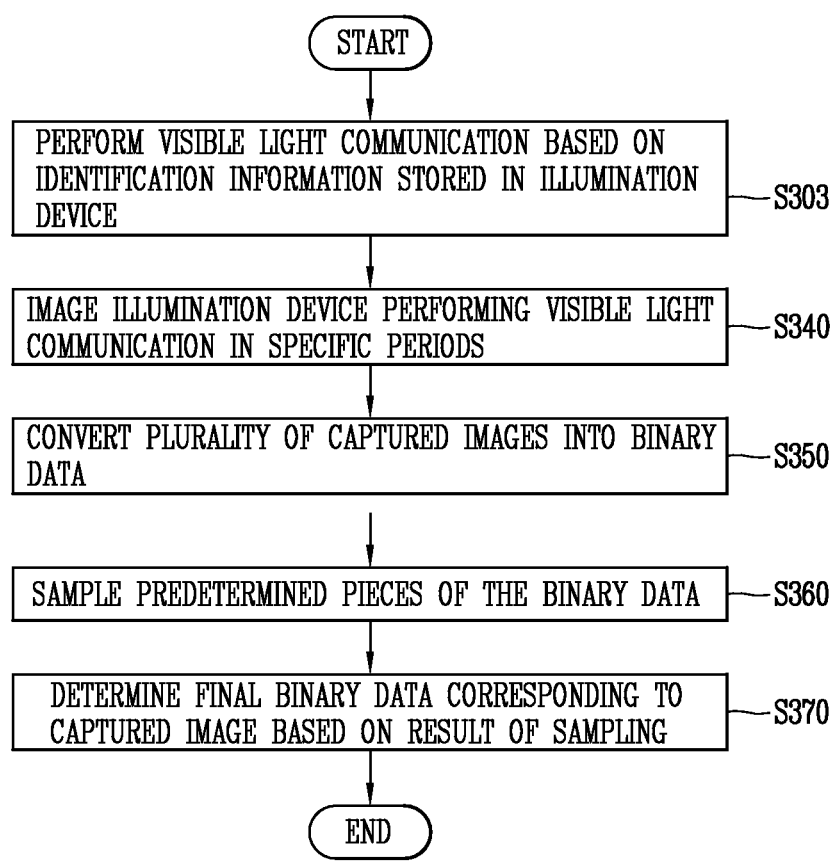

1 IMAGE FRAME = 1bit DATA

DATA = 0          DATA = 1

[LED OFF, DATA = 0]

[LED ON, DATA = 1]

ILLUMINATION SYSTEM AND CONTROL METHOD THEREOF

CROSS-REFERENCE TO RELATED APPLICATIONS

Pursuant to 35 U.S.C. § 119(a), this application claims the benefit of earlier filing date and right of priority to Korean Application No. 10-2016-0001181, filed on Jan. 5, 2016, and Korean Application No. 10-2016-0001182, filed on Jan. 5, 2016, the contents of which are all hereby incorporated by reference herein in their entirety.

BACKGROUND OF THE INVENTION

1. Field of the Invention

The present invention relates to an illumination system and a control method thereof, and more particularly, to an illumination system that recognizes identification information regarding a plurality of illumination apparatuses included in the illumination system, and a control method thereof.

The present invention also relates to a terminal included in an illumination system, and more particularly, to a terminal that receives visible light communication performed by an illumination device included in the illumination system, and a control method thereof.

2. Background of the Invention

Recently, the Internet of Things (IoT) technology is emerging, which connects to various electronic devices disposed in a building or any space over a wired/wireless network and provides an environment for sharing information. In particular, many illumination devices are installed in a building, and the IoT is installed in the illumination devices. Thus, an illumination system including an illumination device that performs wireless communication between a server and a terminal is widely used.

As described above, an illumination system to which the IoT is applied may provide a user with a remote control function that remotely turns on or off a plurality of illumination devices. That is, a user or manager of an illumination system may remotely control an illumination device by transmitting a signal including a command for turning on/off the illumination device to a server of the illumination system using wired/wireless communication without directly manipulating a switch connected to the illumination device.

Also, illumination devices of a general illumination system may receive a command associated with operation of the illumination devices from a server and may operate according to the received command. Accordingly, the illumination devices of the illumination system may perform visible light communication as well as simply being turned on or off.

However, when a server of a general illumination system does not store identification information of a plurality of illumination devices or when the server stores the identification information but the identification information does not match a plurality of illumination devices that are actually installed, the server has a problem in that remote control cannot be selectively performed on some of the plurality of illumination devices.

Also, even when an illumination device malfunctions, a user cannot remotely detect which portion of the illumination device malfunctions and has considerable difficulties in diagnosing failure of the illumination system.

Likewise, even when fault occurs at any point of communication equipment between an illumination device and a server or a power network for supplying power to the illumination device, a user cannot recognize a point at which the failure has occurred by using only information received by the server, thus increasing maintenance cost of the illumination system.

Meanwhile, general illumination systems have a problem of excessive time being required in order for a user to match identification information of an illumination device with information regarding a location where the illumination device is installed or information regarding an arrangement relation with an adjacent illumination device.

In detail, general illumination systems have a problem of excessive time being required to perform the matching process by checking identification of an illumination device while installing the illumination device and by inputting information regarding an installation position of the illumination device in addition to the checked identification information.

Also, when illumination devices are installed and a server performs on/off control on each illumination device in any order, a user cannot be aware of a location of an illumination device on which on/off control is being performed and thus should move to find the location of the illumination device. Accordingly, the user spends excessive time and cost to perform such a task.

In particular, since a plurality of illumination devices are included on each floor of a modern building, it is substantially impossible to perform a task for matching the illumination devices with location information that is randomly set.

Also, when visible light communication of an illumination device is received using a camera of a terminal, a shutter speed of the camera should be synchronized with a unit time of the visible light communication. In this case, when time intervals between frames of the camera of the terminal are not constant, an error may occur when visible light communication is received.

BRIEF SUMMARY

Therefore, an aspect of the detailed description is to provide an illumination system that may recognize identification information of an illumination device using visible light communication of the illumination device and a control method thereof.

Another aspect of the detailed description is to provide an illumination system that may easily match identification information of an illumination device with an installation location using visibility light communication of the illumination device and a control method thereof.

Another aspect of the detailed description is to provide an illumination system installation method that may reduce time required to install an illumination system including a plurality of illumination devices.

Another aspect of the detailed description is to provide a terminal included in an illumination system to prevent occurrence of an error while receiving visible light communication performed by an illumination device and a control method thereof.

Another aspect of the detailed description is to provide an illumination system that may recognize identification information of an illumination device using visible light communication of the illumination device and a control method thereof.

Another aspect of the detailed description is to provide an illumination system that may easily match identification information of an illumination device with an installation location using visibility light communication of the illumination device and a control method thereof.

To achieve these and other advantages and in accordance with the purpose of this specification, as embodied and broadly described herein, there is provided a method of installing an illumination system that performs wireless communication. The illumination system includes at least one illumination device, a server configured to perform wireless communication with the illumination device, and a terminal configured to perform optical communication with the illumination device. The method includes sending information regarding an operation mode of the illumination device from the terminal to the server; sending a control signal from the server to the illumination device based on the information regarding an operation mode; performing visible light communication based on identification information stored in the illumination device when the illumination device receives the control signal; detecting the identification information of the illumination device through the terminal based on the visible light communication; matching the detected identification information with location information of the illumination device; and sending the identification information and the location information of the illumination device that are matched each other to the server.

The matching may include detecting a location of the terminal and matching the detected location of the terminal and the identification information of the illumination device when the identification information of the illumination device is detected.

The detecting of a location of the terminal may include using at least one of a GPS module, a WiFi module, a gyro sensor, or an ultrasonic sensor installed in the terminal to detect the location of the terminal.

The detecting of a location of the terminal may include using information regarding an installation drawing of the illumination device as well as at least one of the GPS module, the WiFi module, the gyro sensor, or the ultrasonic sensor to detect the location of the terminal.

The matching may include receiving a user input to generate location information of the illumination device; and matching the detected identification information with the location information of the illumination device generated by the user input.

The receiving of a user input may include providing at least one classification variable for classifying the illumination device by the terminal and receiving a user selection for the provided classification variable.

The receiving of a user input may include outputting a graphic object associated with the classification variable to a display of the terminal and generating information for classifying the illumination device by a touch input applied to the output graphic object.

The classification variable may include at least one of a floor ID or a room ID of a building in which the illumination device is installed.

The receiving of a user input may include providing a group variable for classifying the illumination device by the terminal and receiving a user selection for the provided group variable.

The matching may include, by the terminal, outputting information associated with an installation order of the illumination device; comparing the installation order with a detection order of the identification information of the illumination device to generate location information of the illumination device corresponding to the detected identification information, and matching the detected identification information with the generated location information.

There is also provided an illumination system including at least one illumination device including a light emitting unit and a memory unit configured to store identification information, a server configured to perform wireless communication with the illumination device and send a control signal for controlling an operation mode of the illumination device to the illumination device, and a terminal having a camera and a wireless communication unit and configured to send information associated with the operation mode of the illumination device to the server by communicating with the server using the wireless communication unit. When the illumination device receives a control signal associated with the operation mode from the server, the illumination device performs visible light communication by turning on or off the light emitting unit on the basis of identification information stored in the illumination device. The terminal captures an image of blinking of the illumination device using the camera, detects the identification information of the illumination device, matches the detected identification information with location information of the illumination device, and sends the identification information and the location information of the illumination device that are matched each other to the server.

The server and the terminal may be connected to each other through WiFi or Zigbee.

The terminal may further include at least one of a GPS module, a WiFi module, a gyro sensor, or an ultrasonic sensor and the terminal may use at least one of the GPS module, the WiFi module, the gyro sensor, or the ultrasonic sensor to detect a location of the terminal and may match the detected location of the terminal with identification information of the illumination device.

The terminal may use information regarding an installation drawing of the illumination device as well as at least one of the GPS module, the WiFi module, the gyro sensor, or the ultrasonic sensor to detect the location of the terminal.

The terminal may further include an input unit configured to receive a user input to generate location information of the illumination device and may match the detected identification information with the location information of the illumination device generated by the user input.

The terminal may further include a display unit configured to output a graphic object associated with at least one classification variable for classifying the illumination device and may generate information for classifying the illumination device based on a touch input applied to the output graphic object.

The terminal may further include a display unit configured to output information associated with an installation order of the illumination device and may compare the installation order with a detection order of the identification information of the illumination device to generate location information of the illumination device corresponding to the detected identification information and match the detected identification information with the generated location information.

There is also provided a method of installing an illumination system that performs wireless communication. The illumination system includes at least one illumination device, a server configured to perform wireless communication with the illumination device, or a terminal configured to perform optical communication with the illumination device. The method includes sending information regarding an operation mode of the illumination device from the terminal to the server; sending a control signal from the server to the illumination device based on the information regarding an operation mode; performing visible light communication based on identification information stored in the illumination device when the illumination device receives the control signal; detecting the identification information of the illumination device through the terminal based on the visible light communication; matching the detected identification information with location information of the illumination device; and sending the identification information and the location information of the illumination device that are matched each other to the server.

The matching may include detecting a location of the terminal and matching the detected location of the terminal and the identification information of the illumination device when the identification information of the illumination device is detected.

The detecting of a location of the terminal may include using at least one of a GPS module, a WiFi module, a gyro sensor, or an ultrasonic sensor installed in the terminal to detect the location of the terminal.

The detecting of a location of the terminal may include using information regarding an installation drawing of the illumination device as well as the at least one of a GPS module, a WiFi module, a gyro sensor, and an ultrasonic sensor to detect the location of the terminal.

The matching may include receiving a user input to generate location information of the illumination device; and matching the detected identification information with the location information of the illumination device generated by the user input.

The receiving of a user input may include providing at least one classification variable for classifying the illumination device by the terminal and receiving a user selection for the provided classification variable.

The receiving of a user input may include outputting a graphic object associated with the classification variable to a display of the terminal and generating information for classifying the illumination device by a touch input applied to the output graphic object.

The classification variable may include at least one of a floor ID or a room ID of a building in which the illumination device is installed.

The receiving of a user input may include providing a group variable for classifying the illumination device by the terminal and receiving a user selection for the provided group variable.

The matching may include, by the terminal, outputting information associated with an installation order of the illumination device; comparing the installation order with an order in which the identification information of the illumination device is detected to generate location information of the illumination device corresponding to the detected identification information, and matching the detected identification information with the generated location information.

There is also provided a terminal included in an illumination system composed of an illumination device, the terminal, and a server. The terminal includes a camera configured to image the illumination device performing visible light communication at predetermined periods to generate a plurality of images; and a controller configured to convert the plurality of images into binary data, sample a predetermined number of pieces of the binary data, and determining final binary data corresponding to each of the generated images based on a result of the sampling.

The controller may detect illumination intensity of a portion of the generated image and determine a binary number corresponding to the generated image based on the detected illumination intensity.

The controller may determine the binary number corresponding to the generated image as 1 when the illumination intensity of a portion of the generated image is greater than or equal to a predetermined value and may determine the binary number corresponding to the generated image as 0 when the illumination intensity of a portion of the generated image is less than or equal to the predetermined value.

When the sampled pieces of binary data are the same binary number, the controller may use the corresponding binary number to determine the final binary data.

The controller may use a binary number corresponding to the majority of the sampled pieces of binary data to determine the final binary data.

The number of sampled pieces of binary data may be three, and the controller may use a binary number included in two or more pieces of the binary data to determine the final binary data.

The number of sampled pieces of binary data may be five, and the controller may use a binary number included in three or more pieces of the binary data to determine the final binary data.

The terminal may further include a wireless communication unit configured to receive setting information regarding visible light communication of the illumination device from the server, and the controller may reset at least one of an imaging period of the camera or the number of samplings based on the received setting information.

The controller may control a visible light communication speed of the illumination device based on information regarding an imaging rate of the camera installed in the terminal.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 5 is a flowchart showing a control method of a terminal included in an illumination system according to an embodiment of the present invention;

DETAILED DESCRIPTION

The embodiments of the invention disclosed in this specification may be applied to an illumination system and a control method thereof. In particular, an embodiment of an illumination system according to the present invention will be described below with reference to FIG. 1.

Figure 1:
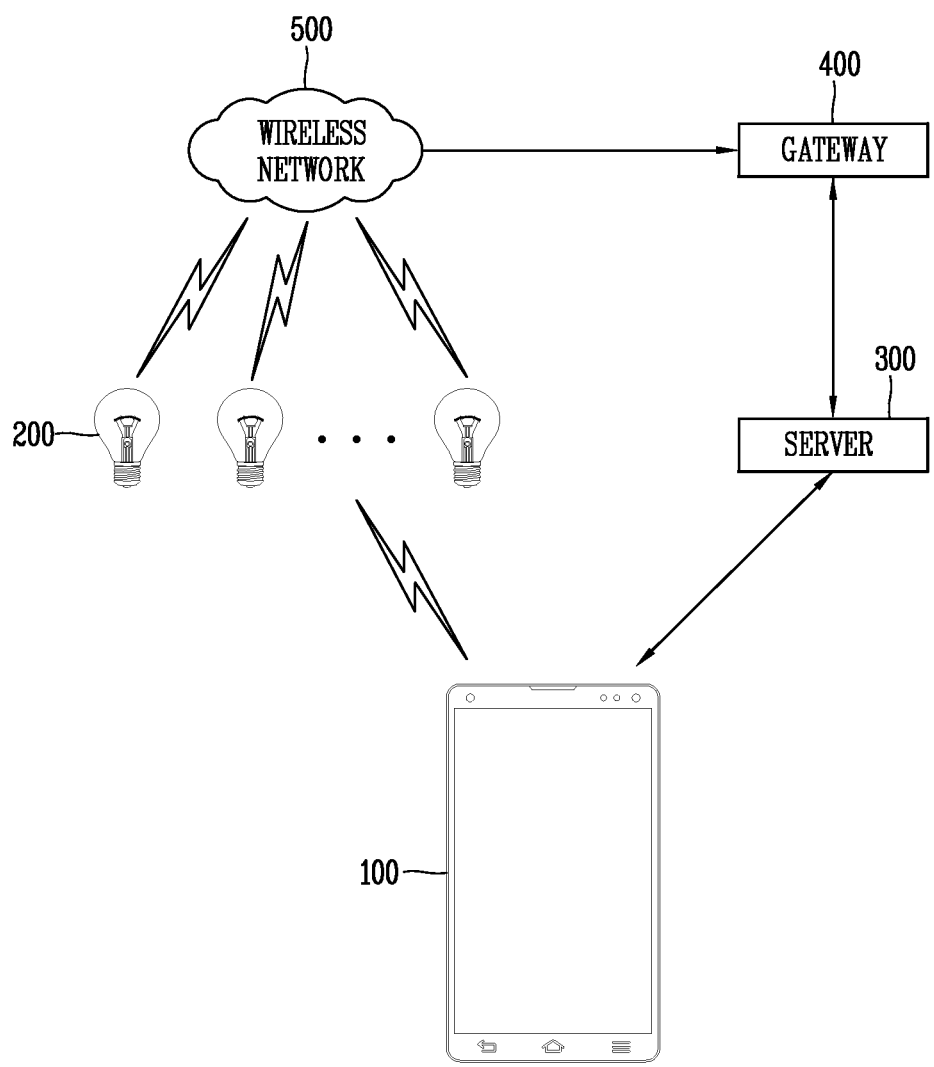
FIG. 1 is a diagram showing an embodiment of an illumination system according to an embodiment of the present invention.

As shown in FIG. 1, an illumination system according to the present invention may include at least one of a mobile terminal 100, an illumination device 200 (or plural devices), a server 300, a gateway 400, or a wireless network 500.

In detail, the depicted illumination system includes a plurality of illumination devices 200 equipped with a wired or wireless communication function to perform wired or wireless communication. Each of the illumination devices 200 may minimize or remove a communication line to perform wireless communication to reduce time or cost needed to install the communication line. Description herein will occasionally refer to a single illumination device 200, but such comments apply equally to embodiments in which multiple illumination devices 200 are implemented.

Also, the illumination device 200 may perform visible light communication according to a predetermined control signal. For instance, the illumination device 200 may perform visible light communication by blinking in a certain pattern. Thus, the illumination device 200 may transmit binary data to a certain (or other) device.

As shown in FIG. 1, the plurality of illumination devices 200 may form the wireless network 500. In detail, the wireless network 500 may be formed with a certain number of illumination devices 200, or the network may be formed for each of floor, or for each room, or other grouping, where the illumination devices 200 are installed. The wireless network 500 formed by the plurality of illumination devices 200 may use one or more of Wibro, WiFi, Zigbee, Bluetooth, and the like.

Further shown in FIG. 1, the gateway 400 transmits or receives data and is shown installed between the server 300 and the wireless network 500. The gateway 400 may store information regarding a plurality of protocols used by the illumination devices 200 and may perform protocol conversion between pieces of data formed in different protocols. In this case, the gateway 400 may perform wired or wireless communication with illumination devices that are manufactured by different manufacturers and configured to process data formed in different protocols. If desired, some or all of the features of gateway 400 may be implemented by server 300.

The server 300 may send a control signal associated with an operation of each of the illumination devices 200 to the illumination device 200 through the wireless network 500 and the gateway 400. The server 300 may also send a control signal associated with an operation of each of the illumination devices 200 by directly performing wired or wireless communication with the illumination device 200. For example, the server 300 may send, to the illumination device 200, a control signal for controlling on or off of the illumination device 200 or a control signal for controlling an operation mode (e.g., dimming) of the illumination device 200.

Also, the server 300 may receive information regarding a state of the illumination device 200 from the illumination device 200. That is, the server 300 may receive information regarding on or off of the illumination device and information regarding malfunction. In addition, the server may also receive information regarding states of the wireless network 500 and the gateway 400 that perform wired or wireless communication between the illumination device 200 and the server 300. Thus, a user who connects to the server 300 may monitor information regarding a state of the illumination system.

The server 300 may be connected to the terminal 100 through WiFi or Zigbee, or other desired protocol, to perform wireless communication. The server 300 may receive a user authentication request from the terminal 100 that performs wireless communication and may authenticate the terminal 100 that sends the user authentication request. Furthermore, the server 300 may send a user authentication response to the terminal 100 according to a result of the authentication.

Figure 2A:
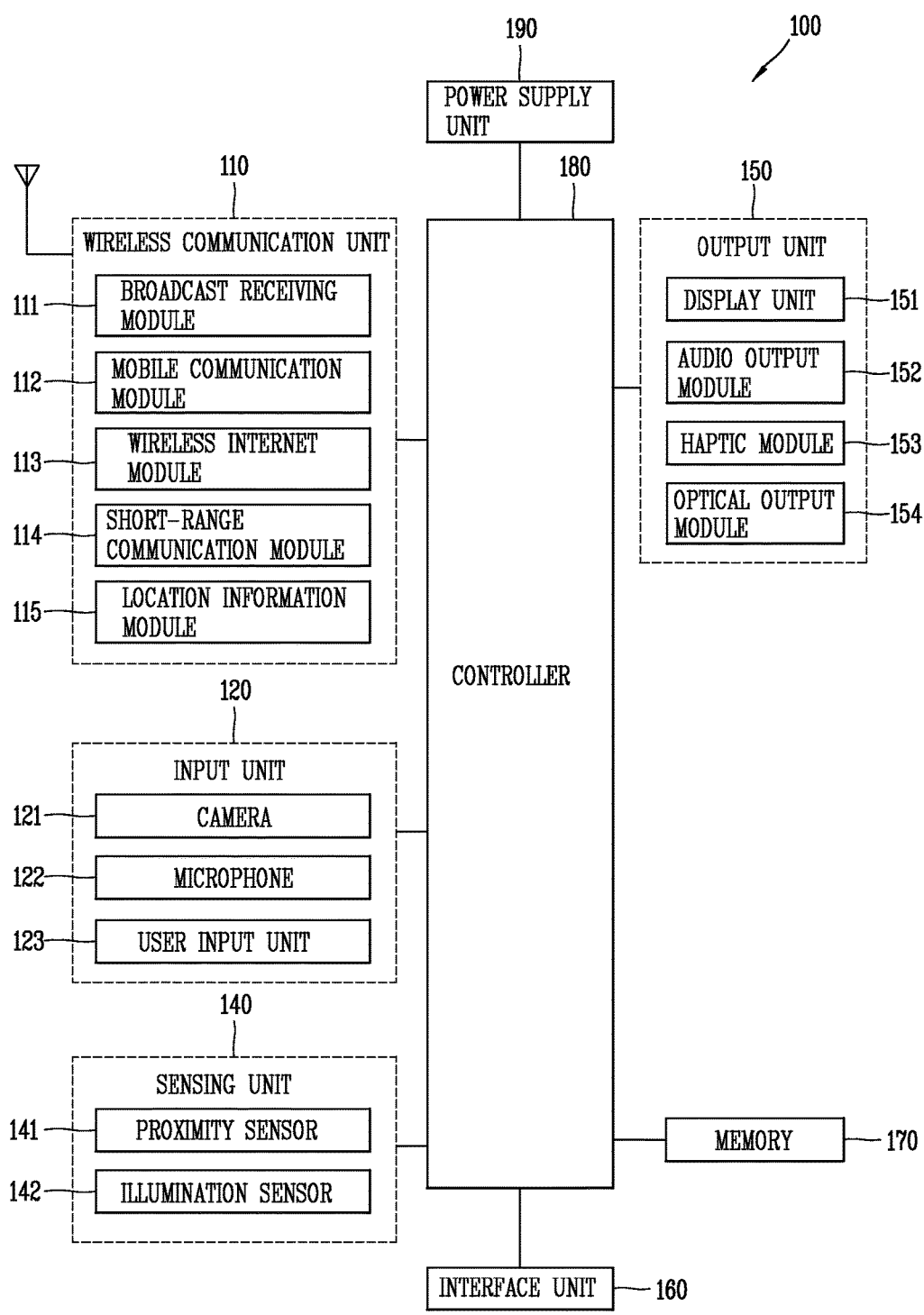
FIG. 2A is a diagram showing elements of a mobile terminal included in an illumination system according to an embodiment of the present invention.

FIG. 2A is a diagram showing elements of a mobile terminal included in an illumination system according to an embodiment of the present invention. As shown in FIG. 2A, the mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring still to FIG. 2A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115. The wireless Internet module 113 may be a Wi-Fi module or a Zigbee module. The location information module 115 may be a GPS module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 2A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170. As one example, the controller 180 controls some or all of the components illustrated in FIG. 2A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 2A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideB and (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

Figure 2B:
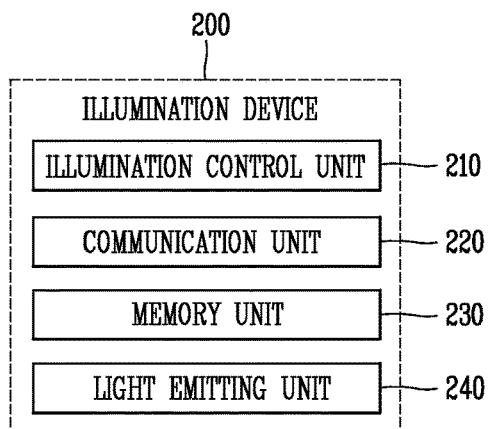
FIG. 2B is a diagram showing elements of an illumination device included in an illumination system according to an embodiment of the present invention.

An embodiment of the illumination device 200 included in an illumination system according to the present invention will be described below with reference to FIG. 2B. The illumination device 200 may include at least one of an illumination control unit 210, a communication unit 220, a memory unit 230, or a light emitting unit 240.

The illumination device 200 may control on/off or brightness of the light emitting unit 240 according to a control signal received through the communication unit 220. The illumination control unit 210 may control the communication unit 220 to send information regarding whether the light emitting unit 240 blinks, malfunctions, or other information, to the server 300. In detail, the illumination control unit 210 may detect whether at least one of the communication unit 220, the memory unit 230, and the light emitting unit 240 malfunctions.

The communication unit 220 may perform communication with the server 300, the gateway 400, the wireless network 500, or other entity. Also, the communication unit 220 may be installed in different illumination devices 200 to perform wireless communication between each other. For example, the communication unit 220 included in the illumination device 200 may use Zigbee, WiFi, or Bluetooth.

The memory unit 230 may store identification information of the illumination device 200. For example, the identification information of the illumination device 200 may include information regarding an ID of the illumination device 200 itself, an illumination zone identifier, and identifiers of the server 300, the gateway 400, and the wireless network 500 to which the illumination device 200 is connected.

The light emitting unit 240 may be formed as any one of a light emitting diode (LED), an incandescent lamp, an electrodeless lamp, or a fluorescent lamp. For example, since the illumination device 200 can transmit binary data to the mobile terminal through visible light communication, the light emitting unit 240 may be formed as an LED that can blink quickly. The light emitting unit 240 may receive a control signal associated with an on/off (blink) operation and may be turned on or off on the basis of the received control signal.

In the illumination device 200, the illumination control unit 210 may control an operation of the illumination device 200 in various operation modes. For example, the illumination control unit 210 may operate the illumination device 200 in a first mode in which the light emitting unit 240 blinks on the basis of an on/off control signal. As another example, the illumination control unit 210 may also operate the illumination device 200 in a second mode in which visible light communication is performed to transmit any binary data.

In an embodiment, when the illumination device 200 operates in the second mode, the illumination control unit 210 may receive an ID of the illumination device 200 itself stored in the memory unit 230, convert the ID of the illumination device 200 into binary data, and control blinking of the light emitting unit 240 on the basis of the binary data. That is, the illumination control unit 210 may control blinking of the light emitting unit 240 in order to express binary data composed of 0 and 1. As an example, in order to perform visible light communication, the illumination control unit 210 may turn off (or on) the light emitting unit 240 to correspond to binary data 0 and may turn on (or off) the light emitting unit 240 to correspond to binary data 1. Other sequences and durations of off/on may be alternatively be implemented to convey such binary data.

Figure 3:
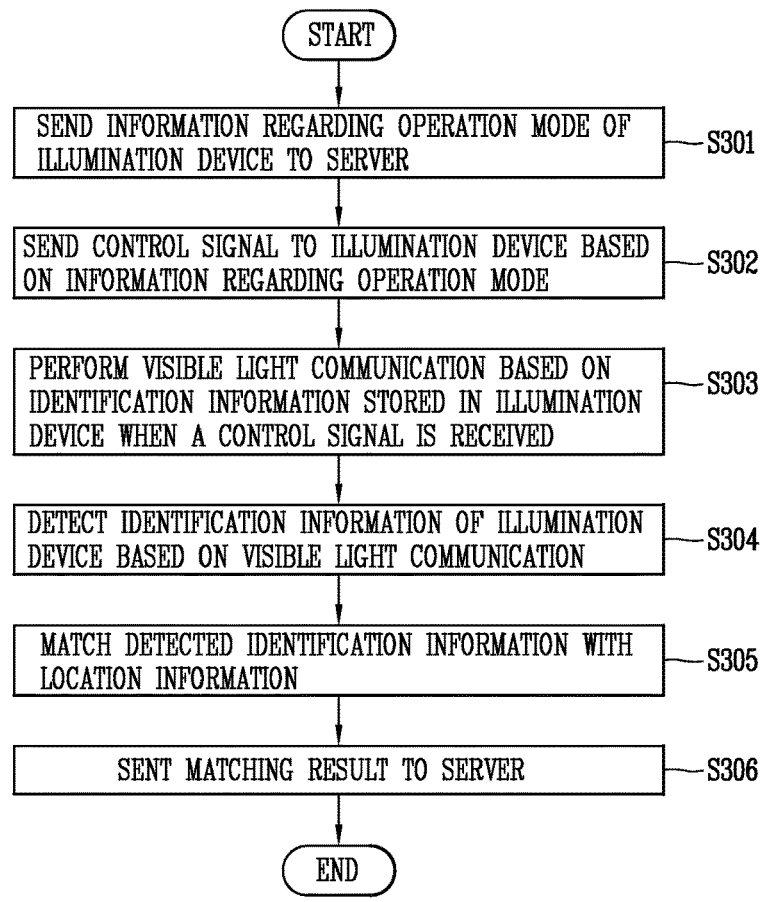
FIG. 3 is a flowchart showing a control method of an illumination system according to an embodiment of the present invention.

FIG. 3 is a flowchart showing a control method of an illumination system according to an embodiment of the present invention. This control method may be implement using various devices shown in FIG. 1

The illumination system according to various embodiments may include at least one illumination device including a light emitting unit and a memory unit configured to store identification information, a server configured to perform wireless communication with the illumination device and send a control signal for controlling an operation mode of the illumination device to the illumination device, and a terminal having a camera and a wireless communication unit and configured to communicate with the server using the wireless communication unit to send information regarding the operation mode of the illumination device to the server.

According to an embodiment the terminal 100 may send information regarding an operation mode of the illumination device 200 to the server 300 (S301). In detail, a controller 180 of the terminal 100 may send the information regarding the operation mode of the illumination device 200 to switch the operation mode of the illumination device 200 on the basis of a touch input applied to an output unit 150. The wireless communication unit 110 of the terminal 100 may perform wireless communication with the server 300 in order to send the information regarding the operation mode. As an example of the wireless communication, WiFi, WLAN, or the like may be used.

In an embodiment, the operation mode of the illumination device 200 may be the second mode in which visible light communication is performed to transmit binary or other data. For instance, the terminal 100 may send information regarding an operation mode to the server 300 in order to switch the operation mode of the illumination device 200 operating in the first mode to the second mode. The second mode may be a mode for recognizing an installation location of the illumination device 200.

In another embodiment, the controller 180 of the terminal 100 may execute an application for recognizing identification information of the illumination device 200, and the output unit 150 may output an execution screen of the application when the application is executed. For example, the execution screen of the application may include a button for switching the operation mode of the illumination device 200 from the first mode to the second mode or from the second mode to the first mode.

Next, the server 300 may send a control signal to the illumination device 200 according to the information regarding the operation mode of the illumination device 200 (S302). The server 300 may also perform on/off or other control of a plurality of illumination devices 200 and may send a control signal to the illumination devices 200 to operate the illumination devices 200 in the second mode.

In particular, when the server 300 receives the information regarding the operation mode of the illumination device 200 from the terminal 100, the server 300 may detect an operation mode associated with the received information and send a control signal to the illumination device 200 to operate the illumination device 200 in the detected operation mode.

When the illumination device 200 receives a control signal for the second mode from the server 300, the illumination device 200 may perform visible light communication based on identification information stored in the illumination device 200 (S303).

The memory unit 230 of the illumination device 200 may store unique identification information. For example, the identification information of the illumination device 200 may include information regarding an ID of the illumination device 200 itself, an illumination zone identifier, and identifiers of the server 300, the gateway 400, and the wireless network 500 to which the illumination device 200 is connected.

In an embodiment, the identification information may be formed as binary data. The illumination device 200 may perform visible light communication on the basis of the identification information formed as the binary data. That is, the illumination control unit 210 of the illumination device 200 may perform visible light communication by controlling an on-time and an off-time of the light emitting unit 240.

For example, the illumination control unit 210 may turn off the light emitting unit 240 for a certain time in order to express "0" through visible light communication (or in this case the lack of visible light). Also, the illumination control unit 210 may turn on the light emitting unit 240 for a certain time in order to express "1" through visible light communication. As described above, the illumination control unit 210 may deliver the identification information through visible light communication by turning on or off the light emitting unit 240.

The illumination control unit 210 may repeatedly deliver the identification information. In an embodiment, the communication unit 220 of the illumination device 200 may receive setting information regarding visible light communication from the server 300. In another embodiment, the illumination device 200 may receive the setting information regarding the visible light communication from the server 300.

The terminal 100 may detect the identification information of the illumination device 200 on the basis of the visible light communication performed by the illumination device 200 (S304). In detail, the camera of the terminal 100 may image the illumination device 200 to generate at least one image.

The terminal 100 may perform transmitting (S301) of information regarding to operation mode of the illumination device 200 to the server 300 and then may switch the operation mode to a mode for receiving the visible light communication. The terminal 100 that operates in the mode for receiving the visible light communication may activate the camera 121, and the activated camera 121 may generate an image associated with the illumination device 200 at predetermined or other time intervals.

In an embodiment, the communication unit 110 of the terminal 100 may receive setting information regarding the visible light communication of the illumination device 200 from the server 300, and the controller 180 may control an imaging interval of the camera 121 and the number of images captured by the camera 121 on the basis of the received setting information.

That is, the communication unit 110 of the terminal 100 may receive setting information regarding the visible light communication from the server 300, and the controller 180 may control the camera 121 to generate an image associated with the illumination device 200 when to turn-on or turn-off of the illumination device 200 is switched, on the basis of the received setting information.

In addition, the controller 180 may detect the identification information of the illumination device 200 based on at least one image generated as described above.

In an embodiment, the controller 180 may detect binary data corresponding to the identification information of the illumination device 200 by interpreting the visible light communication on the basis of illumination intensity of the generated image. Subsequently, the terminal 100 may match the detected identification information with location information of the illumination device 200 (S305).

As an example, whenever the terminal 100 detects identification information of any one of the plurality of illumination devices 200, location information corresponding to the illumination device may be automatically generated by the terminal 100. As another example, whenever the terminal 100 detects identification information of any one of the plurality of illumination devices 200, location information corresponding to the illumination device may also be generated by a user input applied to the terminal 100.

In an embodiment, the matching of the identification information with location information (S305) may include detecting a location of the terminal 100 and matching the detected location of the terminal 100 with the identification information of the illumination device 200 when the identification information of the illumination device 200 is detected.

That is, the controller 180 of the terminal 100 may detect identification information of any illumination device, detect location information of any one of the plurality of illumination devices 200 corresponding to the detected identification information, and match the detected identification information with the detected location information.

While the controller 180 of the terminal 100 performs a process of detecting a location of the terminal 100, the controller 180 may use at least one of a GPS module, a WiFi module, a gyro sensor, or an ultrasonic sensor installed in the terminal 100 to detect the location of the terminal 100.

That is, the controller 180 may detect the location of the terminal 100 using information detected by a GPS module and may determine whether the detected location of the terminal corresponds to location information of the illumination device 200 of which identification information is detected.

Also, while the controller 180 of the terminal 100 performs the process of detecting the location, the controller 180 may detect the location of the terminal 100 using information regarding an installation drawing of the illumination device 200 in addition to at least one of the GPS module, the WiFi module, the gyro sensor, or the ultrasonic sensor.

In another embodiment, the matching of the identification information with location information (S305) may include receiving a user input to generate location information of the illumination device 200 and matching the detected identification information with the location information of the illumination device 200 generated by the user input.

In detail, when the terminal 100 receives the user input to generate the location information of the illumination device 200, the terminal 100 may provide at least one classification variable for classifying the illumination device 200 and receive a user selection for the provided classification variable. In this case, the classification variable may include a variable about a floor, room, or other location of a building in which the illumination device 200 is installed.

For example, when the controller 180 of the terminal 100 detects the identification information of the illumination device, the terminal 100 may receive a user input associated with a classification variable about the location of the illumination device corresponding to the detected identification information.

The controller 180 of the terminal 100 may control a display of the terminal 100 to output an image object associated with the classification variable in order to receive the user input. In addition, the controller 180 may generate information for classifying the illumination device by a touch input applied to the output image object. For example, the classification variable may include at least one of a floor ID or a room ID of the building in which the illumination device is installed. As another example, when the controller 180 of the terminal 100 detects identification information of an illumination device, the terminal 100 may receive a user input associated with a group variable about a location of the illumination device corresponding to the detected identification information.

The controller 180 of the terminal 100 may control a display of the terminal 100 to output an image object associated with the group variable in order to receive the user input. In addition, the controller 180 may generate information for classifying the illumination device by a touch input applied to the output image object.

In another embodiment, the matching of the identification information with location information (S305) may include, by the terminal, outputting information regarding an installation order of the illumination device, comparing the installation order with a detection order of the identification information of the illumination device to generate location information of the illumination device corresponding to the detected identification information, and matching the detected identification information with the generated location information. When the matching is completed, the terminal 100 may send a result of the matching to the server 300 (S306). The server 300 may store a result of matching between identification information and location information of the plurality of illumination devices 200 in a database.

Figure 4:
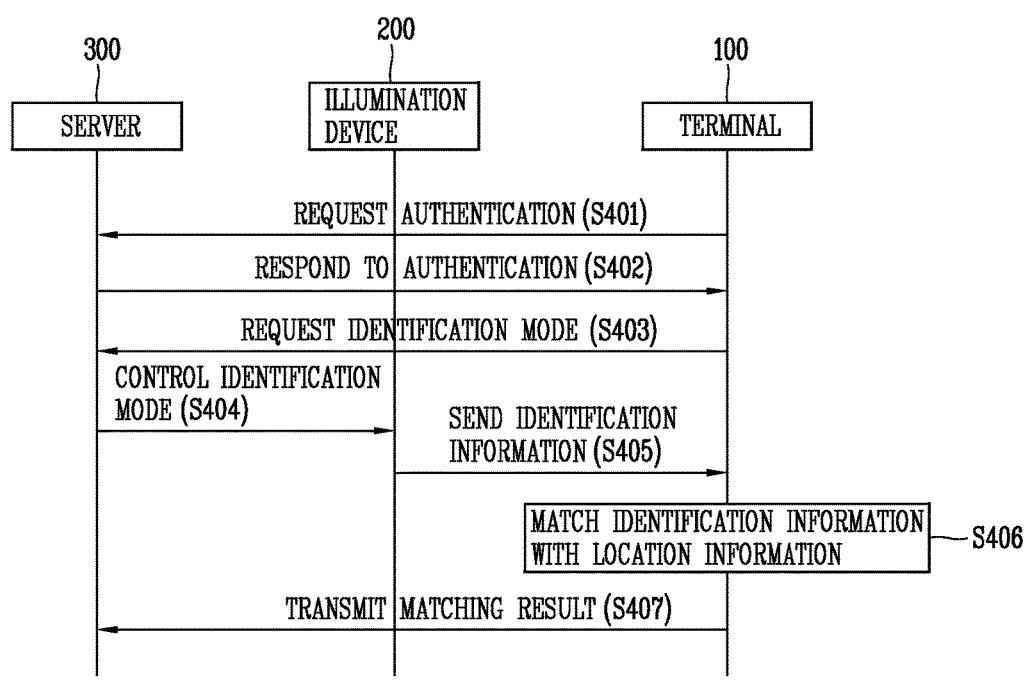
FIG. 4 is a flowchart showing a method of matching identification information and location information of an illumination device in a control method of an illumination system according to an embodiment of the present invention.

FIG. 4 is a flowchart showing a method of matching identification information and location information of an illumination device in a control method of an illumination system according to an embodiment of the present invention. As shown in FIG. 4, the terminal 100 may request user authentication from the server 300 (S401), and the server 300 may send an authentication response to the request to the terminal 100 (S402).

When an authentication operation between the terminal 100 and the server 300 is completed, the terminal 100 may send an identification mode request to the server 300 (S403) in order to operate an illumination system in an identification mode. When the identification mode request is received, the server 300 may control the illumination device 200 to operate in an identification mode (S404). In this case, the illumination device 200 may send identification information to the terminal 100 by performing visible light communication (S405).

Next, the terminal 100 may match the sent identification information with location information of the corresponding illumination device 200 (S406) and may send a result of the matching to the server 300 (S407).

FIG. 5 is a flowchart showing a control method of a terminal included in an illumination system according to an embodiment of the present invention. The control method shown in FIG. 5 may be implemented using, for example, the illumination device 200, the terminal 100, and the server 300, as shown in FIG. 1.

The illumination system according to embodiments of the present invention may include at least one illumination device including a light emitting unit and a memory unit configured to store identification information, a server configured to perform wireless communication with the illumination device and send a control signal for controlling an operation mode of the illumination device to the illumination device, and a terminal having a camera and a wireless communication unit and configured to communicate with the server using the wireless communication unit to send information regarding the operation mode of the illumination device to the server. An embodiment of an installation method of the illumination system will be described below.

First, the terminal 100 may send information regarding an operation mode of the illumination device 200 to the server 300. In detail, the controller 180 of the terminal 100 may send the information regarding an operation mode of the illumination device 200 to switch the operation mode of the illumination device 200 on the basis of a touch input applied to an output unit 150. The wireless communication unit 110 of the terminal 100 may perform wireless communication with the server 300 in order to send the information regarding the operation mode. As an example of the wireless communication, WiFi, WLAN, or the like may be used.

In an embodiment, the operation mode of the illumination device 200 may be the second mode in which visible light communication is performed to transmit any binary data. That is, the terminal 100 may send the information regarding the operation mode to the server 300 in order to switch the operation mode of the illumination device 200 operating in the first mode into the second mode. The second mode may be a mode for recognizing an installation location of the illumination device 200.

In another embodiment, the controller 180 of the terminal 100 may execute an application for recognizing identification information of the illumination device 200, and the output unit 150 may output an execution screen of the application when the application is executed. For example, the execution screen of the application may include a button for switching the operation mode of the illumination device 200 from the first mode to the second mode or from the second mode to the first mode.

Next, the server 300 may send a control signal to the illumination device 200 based on the information regarding the operation mode of the illumination device 200. The server 300 may also perform on/off control of a plurality of illumination devices 200 and may send a control signal to the illumination devices 200 to operate the illumination devices 200 in the second mode. In particular, when the server 300 receives the information regarding the operation mode of the illumination device 200 from the terminal 100, the server 300 may detect an operation mode associated with the received information and send a control signal to the illumination device 200 to operate the illumination device 200 in the detected operation mode.

When the illumination device 200 receives a control signal for the second mode from the server 300, the illumination device 200 may perform visible light communication based on identification information stored in the illumination device 200 (S303).

The memory unit 230 of the illumination device 200 may store unique identification information. For example, the identification information of the illumination device 200 may include information regarding an ID of the illumination device 200 itself, an illumination zone identifier, and identifiers of the server 300, the gateway 400, and the wireless network 500 to which the illumination device 200 is connected.

In an embodiment, the identification information may be formed as binary data. The illumination device 200 may perform visible light communication on the basis of the identification information formed as the binary data. That is, the illumination control unit 210 of the illumination device 200 may perform visible light communication by controlling an on-time and an off-time of the light emitting unit 240.

For example, the illumination control unit 210 may turn off the light emitting unit 240 for a certain time in order to express "0" through visible light communication. Also, the illumination control unit 210 may turn on the light emitting unit 240 for a certain time in order to express "1" through visible light communication. As described above, the illumination control unit 210 may deliver the identification information through visible light communication by repeatedly turning on and off the light emitting unit 240. Thus, the illumination control unit 210 may repeatedly deliver the identification information through visible light communication.

In an embodiment, the communication unit 220 of the illumination device 200 may receive setting information regarding visible light communication from the server 300. In another embodiment, the illumination device 200 may receive the setting information regarding the visible light communication from the server 300.

The terminal 100 may detect the identification information of the illumination device 200 based on the visible light communication performed by the illumination device 200. In detail, the camera 121 of the terminal 100 may image the illumination device 200 performing the visible light communication at specific periods (S340). The imaging period of the camera 121 may correspond to a blinking period of the illumination device 200. That is, the imaging period of the camera 121 may correspond to a time for which the illumination device 200 is kept on or off in order to express one-bit binary data.

In another embodiment, the imaging period of the camera 121 may correspond to a value obtained by dividing the blinking period of the illumination device 200 by a predetermined integer. That is, the camera 121 may capture a plurality of image of the illumination device 200 while the illumination device 200 is kept on or off in order to express one-bit binary data. The imaging period of the camera 121 may be expressed in frames per second (FPS). For example, the imaging period of the camera 121 may be 30 FPS or 60 FPS.

The controller 180 of the terminal 100 may convert the captured images into binary data (S350). In detail, the controller 180 of the terminal 100 may detect illumination intensity of some of the images captured by the camera 121. In addition, the controller 180 may determine a binary number corresponding to the generated image on the basis of the detected illumination intensity. For example, when the detected illumination intensity is greater than or equal to predetermined value, the controller 180 may determine a binary number corresponding to the generated image as "1."

As another example, when the detected illumination intensity is less than or equal to the predetermined value, the controller 180 may determine a binary number corresponding to the generated image as "0." That is, the controller 180 may convert an image captured by the camera 121 into a binary number "0" or "1" according to illumination intensity detected from the image.

Meanwhile, the controller 180 may convert some of the generated images into information that uses a predetermined color format. For example, the information that uses a color format may be composed of brightness information Y indicating brightness of light, first color information U, and second color information V. In this case, the controller 180 may extract only the brightness information Y from the information that uses a color format, compare the extracted brightness information Y with a predetermined brightness threshold value, and convert the generated image into binary data 0 or 1 as a result of the comparison.

In addition, the controller 180 of the terminal 100 may sample a predetermined number of pieces of the binary data (S360). The controller 180 may determine final binary data corresponding to the captured image on the basis of a result of the sampling (S370). In detail, when the sampled pieces of binary data are the same binary number, the controller 180 may use the corresponding binary number to determine the final binary data. Also, the controller 180 may use a binary number corresponding to the majority of the sampled pieces of binary data to determine the final binary data.

In an embodiment, the controller 180 may sample three pieces of the binary data into which the generated images are converted. Subsequently, the controller 180 may detect two or more pieces of binary data from a set of the sampled binary data and may determine the final binary data using the detected two or more pieces of binary data.

In another embodiment, the controller 180 may sample five pieces of the binary data into which the generated images are converted. Subsequently, the controller 180 may detect three or more pieces of binary data from a set of the sampled binary data and may determine the final binary data using the detected three or more pieces of binary data.

Meanwhile, although not shown in FIG. 5, the wireless communication unit 110 of the terminal 100 may receive the setting information regarding the visible light communication of the illumination device 200 from the server 300 included in the illumination system. For example, the setting information regarding the visible light communication of the illumination device 200 may include information regarding a time for which the illumination device 200 is kept on or off in order to express one-bit binary data. As another example, the setting information regarding the visible light communication of the illumination device 200 may include information regarding operations of the illumination device 200 corresponding to binary data 0 and 1. Thus, the controller 180 may reset at least one of the imaging period of the camera 121 or the number of samplings on the basis of the received setting information.

In more detail, when the time for which the illumination device 200 is kept on or off is smaller than a predetermined interval, the controller 180 may decrease the imaging period of the camera 121. Also, when the time for which the illumination device 200 is kept on or off is greater than the predetermined interval, the controller 180 may increase the imaging period of the camera 121.

Meanwhile, the terminal 100 may be switched to a mode for receiving visible light communication after sending the information regarding the operation mode of the illumination device 200 to the server 300. The terminal 100 that operates in the mode for receiving the visible light communication may activate the camera 121, and the activated camera 121 may generate an image associated with the illumination device 200 at predetermined time intervals.

In an embodiment, the communication unit 110 of the terminal 100 may receive setting information regarding the visible light communication of the illumination device 200 from the server 300, and the controller 180 may control an imaging interval of the camera 121 and the number of images captured by the camera 121 on the basis of the received setting information.

That is, the communication unit 110 of the terminal 100 may receive the setting information associated with the visible light communication from the server 300, and the controller 180 may control the camera 121 to generate an image associated with the illumination device 200 when turn-on or turn-off of the illumination device 200 is switched, on the basis of the received setting information.

In addition, the controller 180 may detect the identification information of the illumination device 200 on the basis of at least one image generated as described above. In an embodiment, the controller 180 may detect binary data corresponding to the identification information of the illumination device 200 by interpreting the visible light communication on the basis of illumination intensity of the generated image. Subsequently, the terminal 100 may match the detected identification information with location information of the illumination device 200.

As an example, whenever the terminal 100 detects identification information of any one of the plurality of illumination devices 200, location information corresponding to the any one illumination device may be automatically generated by the terminal 100. As another example, whenever the terminal 100 detects identification information of any one of the plurality of illumination devices 200, location information corresponding to the any one illumination device may also be generated by a user input applied to the terminal 100.

The controller 180 of the terminal 100 may detect identification information of any illumination device, detecting location information of any one of the plurality of illumination devices 200 corresponding to the detected identification information, and match the detected identification information with the detected location information.

While the controller 180 of the terminal 100 performs a process of detecting a location of the terminal 100, the controller 180 may use at least one of a GPS module, a WiFi module, a gyro sensor, or an ultrasonic sensor installed in the terminal 100 to detect the location of the terminal 100. For example, the controller 180 may detect the location of the terminal 100 using information detected by a GPS module and may determine whether the detected location of the terminal corresponds to location information of the illumination device 200 of which identification information is detected.

Also, while the controller 180 of the terminal 100 performs the process of detecting the location, the controller 180 may detect the location of the terminal 100 using information regarding an installation drawing of the illumination device 200 in addition to at least one of the GPS module, the WiFi module, the gyro sensor, or the ultrasonic sensor.

In another embodiment, the matching of the identification information with location information (S305) may include receiving a user input to generate location information of the illumination device 200 and matching the detected identification information with the location information of the illumination device 200 generated by the user input. In detail, when the terminal 100 receives the user input to generate the location information of the illumination device 200, the terminal 100 may provide at least one classification variable for classifying the illumination device 200 and receive a user selection for the provided classification variable. In this case, the classification variable may include a variable about a floor or room of a building in which the illumination device 200 is installed.

For example, when the controller 180 of the terminal 100 detects the identification information of the illumination device, the terminal 100 may receive a user input associated with a classification variable about the location of the illumination device corresponding to the detected identification information. The controller 180 of the terminal 100 may control a display of the terminal 100 to output an image object associated with the classification variable in order to receive the user input. In addition, the controller 180 may generate information for classifying the illumination device by a touch input applied to the output image object. For example, the classification variable may include at least one of a floor ID or a room ID of the building in which the illumination device is installed.

As another example, when the controller 180 of the terminal 100 detects identification information of an illumination device, the terminal 100 may receive a user input associated with a group variable about a location of the illumination device corresponding to the detected identification information. The controller 180 of the terminal 100 may also control a display of the terminal 100 to output an image object associated with the group variable in order to receive the user input. In addition, the controller 180 may generate information for classifying the illumination device by a touch input applied to the output image object.

Figure 6A:
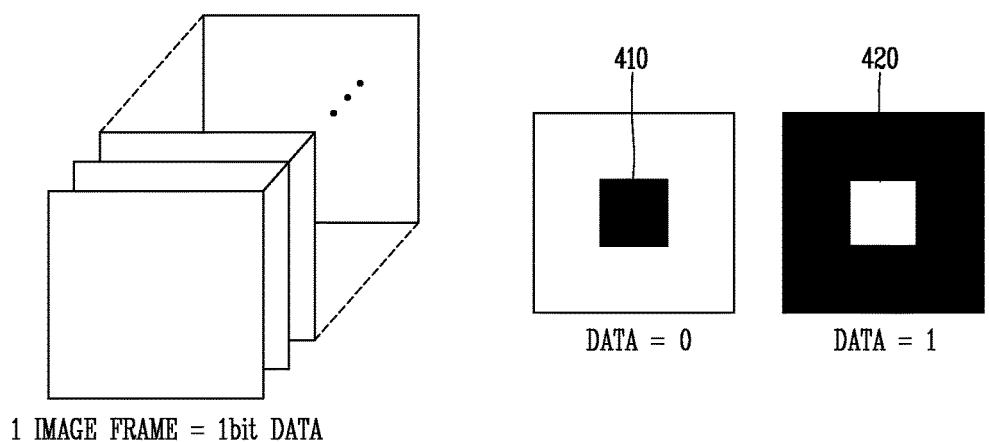
FIGS. 6A to 6C are diagrams showing embodiments associated with a terminal that receives visible light communication according to the present invention.
Figure 6B:
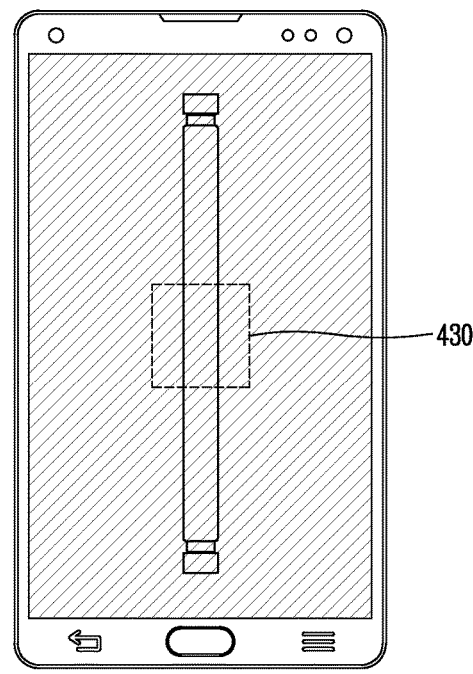
Figure 6C:
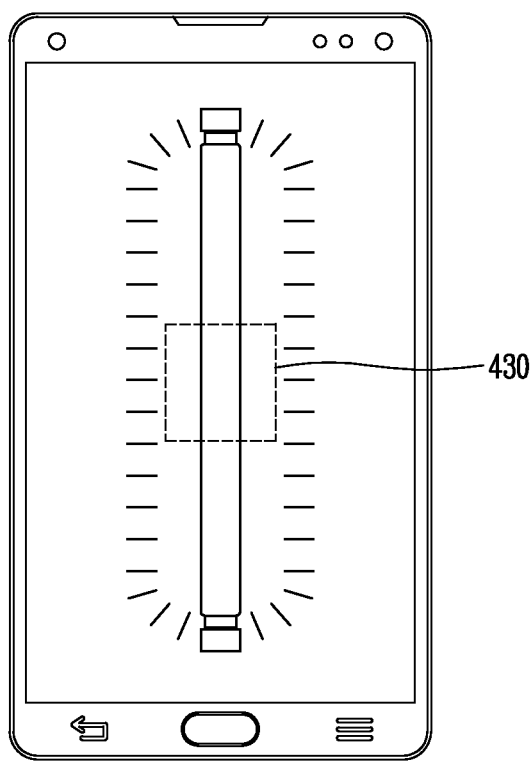

FIGS. 6A to 6C are diagrams showing embodiments associated with a terminal that receives visible light communication according to the present invention. As shown in FIG. 6A, the camera 121 may capture an image associated with the illumination device 200, and the controller 180 may converts one frame of the captured image into one-bit data.

Referring to FIG. 6A, the controller 180 may adjust an imaging rate of the camera 121 and determine the number of captured images while the illumination device 200 is kept on or off in order to deliver one-bit binary data through visible light communication. That is, the controller 180 may control the imaging rate of the camera 121 in order to adjust the number of images to be captured per unit time of the visible light communication performed by the illumination device 200. In detail, the controller 180 may detect brightness or illumination information of some 410 and 420 of the images captured by the camera 121 and may determine whether the detected brightness or illumination information is greater than or equal to reference brightness intensity or reference illumination intensity.

For example, referring to FIG. 6B, the controller 180 may detect brightness or illumination intensity of the image 410 that is captured when the illumination device 200 is turned off and may generate binary data 0 corresponding to the captured image 410 on the basis of the detected brightness or illumination intensity.

As another example, referring to FIG. 6C, the controller 180 may detect brightness or illumination intensity of the image 420 that is captured when the illumination device 200 is turned on and may generate binary data 1 corresponding to the captured image 420 based on the detected brightness or illumination intensity.

Referring to FIGS. 6B and 6C, based on a partial area 430 of an image obtained by capturing the illumination device 200, the controller 180 may determine binary data corresponding to the captured image. For instance, the controller 180 does not use the entire image captured by the camera 121 and may use only a portion of the captured image to generate binary data corresponding to the captured image. For example, the portion may be a partial area 430 formed as a quadrangle including the center of the image. Also, the controller 180 may adjust an imaging range of the camera 121 and may acquire an image for analyzing visible light communication performed by the illumination device 200.

The controller 180 may also control a display unit 151 to output guide information for receiving the visible light communication of the illumination device 200. For example, the guide information may be formed as a quadrangular outline. That is, when the terminal 100 is switched to a mode for recognizing the identification information of the illumination device 200 and the guide information is output to the display unit, a user may adjust an imaging angle, an imaging position, and the like for the illumination device 200 using the guide information.

Figure 7:
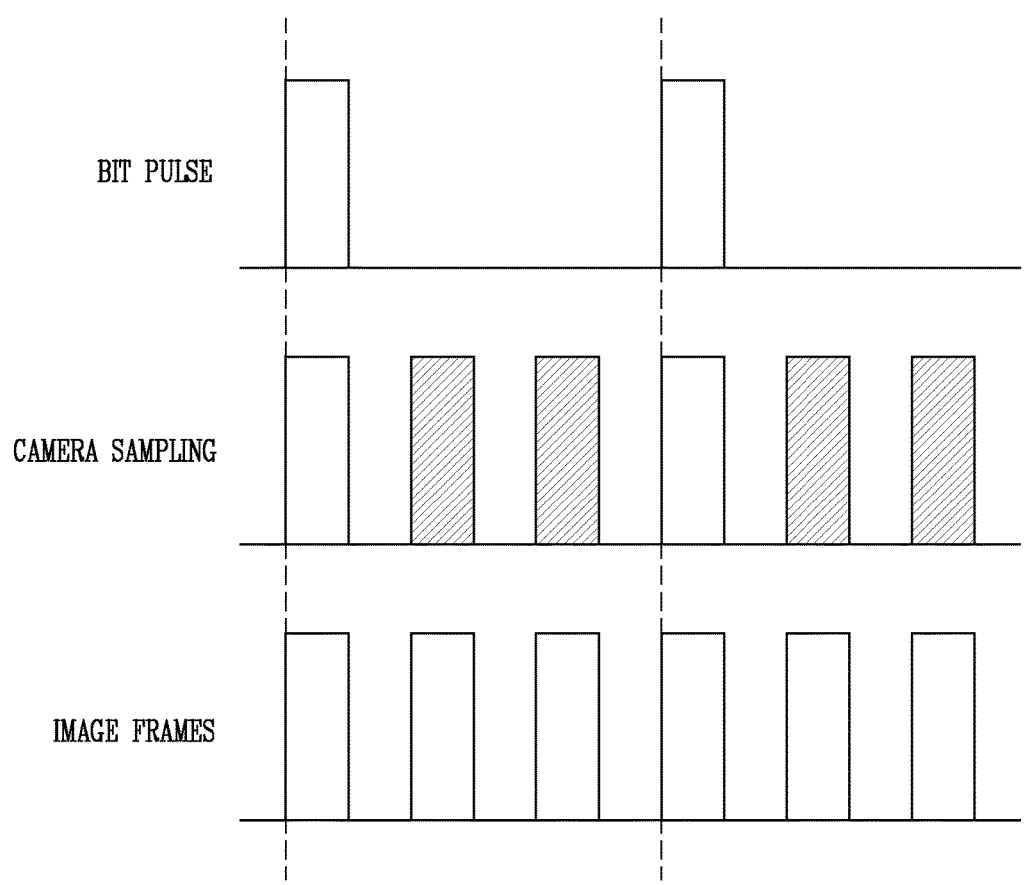
FIG. 7 is a conceptual diagram showing a method of extracting binary data from visible light communication by a terminal according to an embodiment of the present invention.

FIG. 7 is a conceptual diagram showing a method of extracting binary data from visible light communication by a terminal according to an embodiment of the present invention. Referring to FIG. 7, the first graph (Bit Pulse) shows a time interval at which the illumination device 200 performs visible light communication in order to deliver one-bit binary data.

In addition, when the number of samplings is three, the controller 180 may control a camera to generate three images corresponding to one unit of the visible light communication of the illumination device 200. That is, as shown in FIG. 7, the second graph (Camera Sampling) shows that the camera 121 generates three sample images on the basis of one bit pulse. The controller 180 may form image frames corresponding to the generated three sample images.

According to the illumination system and the control method thereof disclosed herein, even when a plurality of illumination devices are included in an illumination system, a user or manager can easily match identification information of the illumination devices with location information of the illumination devices. Also, an installation process of an illumination system can be simplified, thus reducing time and costs required to install the plurality of illumination devices. Further, it is possible to simply and conveniently match identification information of an illumination device with information regarding an installation location of the illumination device and an arrangement relation with adjacent illumination devices by using visible light communication, thus enhancing usability of an illumination system.

In a server of an illumination system according to the present disclosure, identification information allocated for each illumination device is matched with information regarding an installation location of the illumination device, and thus it is possible to perform remote control of some of a plurality of illumination devices that are desired by a user. Accordingly, a range of the remote control provided by the illumination system is increased.

Even when a plurality of illumination devices are included in an illumination system, a user or manager can easily match identification information of the illumination devices with location information of the illumination devices. According to the terminal and the control method thereof disclosed herein, it is possible to accurately receive visible light communication performed by an illumination device, irrespective of the type of the illumination device. That is, it is possible to enhance a reception rate of the visible light communication of the terminal.

It is also possible to accurately receive visible light communication performed by an illumination device even when an imaging period of a camera is not maintained at a constant value. Furthermore, it is possible to reduce costs required for visible light communication because visible light communication can be accurately received using a general mobile terminal without separate equipment for the visible light communication.

Still further, an installation process of an illumination system can be simplified, thus reducing time and costs required to install the plurality of illumination devices.

It is further possible to simply and conveniently match identification information of an illumination device with information regarding an installation location of the illumination device and an arrangement relation with adjacent illumination devices by using visible light communication, thus enhancing usability of an illumination system.

In a server of an illumination system according to the present disclosure, identification information allocated for each illumination device is matched with information regarding an installation location of the illumination device, and thus it is possible to perform remote control of some of a plurality of illumination devices that are desired by a user. Accordingly, a range of the remote control provided by the illumination system is increased.

What is claimed is:

1. A method performed at a terminal having a display and a camera, the method comprising:
   executing an application program for recognizing identification information of an illumination device;
   displaying, on the display, an execution screen of the application when the application is executed, wherein the execution screen includes a button for switching an operation mode of the illumination device;
   switching an operation mode of the illumination device from a first mode to a second mode according to a user input applied to the button of the displayed execution screen, wherein the illumination device blinks based on an on/off control signal while the first mode is selected, and the illumination device performs visible light communication to transmit binary data while the second mode is selected;
   obtaining at predetermined periods, via the camera, an image of the illumination device to obtain a plurality of images, wherein the plurality of images are obtained while the illumination device is performing visible light communication;
   generating binary data according to each of the plurality of images;
   sampling a predetermined number of the binary data;
   determining final binary data based on a result of the sampling; and
   storing the final binary data as the identification information of the illumination device.

2. The method of claim 1, wherein the generating the binary data comprises:
   identifying illumination intensity of a portion of each of the plurality of images; and
   determining a binary number corresponding to each of the plurality of images based on the identified illumination intensity of an associated one of the plurality of images.

3. The method of claim 1, wherein the determining the final binary data comprises using a corresponding binary number to determine the final binary data when the sampled predetermined number of the binary data have a same binary number.

4. The method of claim 1, wherein the determining the final binary data comprises using a binary number corresponding to a majority of the sampled predetermined number of the binary data to determine the final binary data.

5. The method of claim 1, further comprising:
   receiving setting information regarding visible light communication of the illumination device from a server associated with the illumination system; and
   resetting at least one of an imaging period of the camera or a number of samplings based on the received setting information.

6. The method of claim 1, further comprising:
   sending a control signal to a server to control a visible light communication speed of the illumination device based on information regarding an imaging rate of the camera associated with the terminal.

7. The method of claim 2, wherein the generating the binary data further comprises:
   determining the binary number corresponding to each image of a first group of the plurality of images as 1 when the illumination intensity of a portion of each image of the first group is greater than or equal to a predetermined value; and
   determining the binary number corresponding to each image of a second group of the plurality of images as 0 when the illumination intensity of a portion of each image of the second group is less than or equal to the predetermined value.

8. The method of claim 4, wherein a number of the sampled predetermined number of the binary data is three, and the determining the final binary data comprises using a binary number included in two or more samples of the binary data to determine the final binary data.

9. The method of claim 4, wherein a number of the sampled predetermined number of the binary data is five, and the determining of final binary data comprises using a binary number included in three or more samples of the binary data to determine the final binary data.

10. A terminal, comprising:
a camera;
a display; and
a controller configured to:
execute an application program for recognizing identification information of an illumination device;
cause the display to display an execution screen of the application when the application is executed, wherein the execution screen includes a button for switching the operation mode of the illumination device;
switch an operation mode of the illumination device from a first mode to a second mode according to a user input applied to the button of the displayed execution screen, wherein the illumination device blinks based on an on/off control signal while the first mode is selected, and the illumination device performs visible light communication to transmit binary data while the second mode is selected;
obtain, via the camera, an image at predetermined periods of the illumination device to obtain a plurality of images, wherein the plurality of images are obtained while the illumination device is performing visible light communication;
generate binary data according to each of the plurality of images;
sample a predetermined number of the binary data;
determine final binary data based on a result of the sampling; and
store the final binary data as the identification information of the illumination device.

* * * * *